United States Patent [19]
Schäfer et al.

[11] Patent Number: 5,466,121
[45] Date of Patent: Nov. 14, 1995

[54] HYDRAULIC ADJUSTMENT DEVICE

[75] Inventors: Horst Schäfer, Rhade; Günter Schaaf, Bremen, both of Germany

[73] Assignee: KSB Aktiengesellschaft, Frankenthal, Germany

[21] Appl. No.: 200,237

[22] Filed: Feb. 23, 1994

[30] Foreign Application Priority Data

Feb. 27, 1993 [DE] Germany ............... 43 06 140.0

[51] Int. Cl.$^6$ ............................................. F03B 03/06
[52] U.S. Cl. ........................................ 415/129; 416/157 R
[58] Field of Search ................ 415/129; 416/157 A, 416/157 R, 156

[56] References Cited

U.S. PATENT DOCUMENTS

| | | | |
|---|---|---|---|
| 3,229,771 | 1/1966 | Hedberg | 416/157 A |
| 3,447,783 | 6/1969 | Wijkander | 415/129 |
| 3,785,747 | 1/1974 | Mayo, Jr. | 415/129 |
| 4,229,141 | 10/1980 | de Francisco Mesado | 416/158 |
| 4,253,808 | 3/1981 | White . | |
| 4,419,252 | 12/1983 | Shim . | |
| 5,038,563 | 8/1991 | McMahan et al. . | |

FOREIGN PATENT DOCUMENTS

| | | | |
|---|---|---|---|
| 0174286 | 10/1990 | European Pat. Off. . | |
| 694029 | 7/1940 | Germany . | |
| 697416 | 10/1940 | Germany . | |
| 972992 | 7/1949 | Germany . | |
| 0963640 | 4/1957 | Germany | 416/156 |
| 2250473 | 10/1972 | Germany . | |
| 3046209C2 | 12/1980 | Germany . | |
| 0239874 | 3/1946 | Switzerland | 416/157 R |
| 345622 | 9/1956 | Switzerland . | |
| 0345622 | 5/1960 | Switzerland | 416/157 R |

OTHER PUBLICATIONS

Transactions of the Nuclear Society and the European Nuclear Society, 1984 International Conference On Nuclear Power—A Global Reality, vol. 47, Nov. 11–16, 1984; Sheraton–Washington Hotel, Washington, D.C. pp. 465 and 466.

Storek, H.: Neuere Konstrucktfonen kleinerer und mittelgroler Kaplanturbinen. In: Engergie, Jg.5, Nr. 8 15. Aug. 1953, S.232–234.

Primary Examiner—Edward K. Look
Assistant Examiner—Mark Sgantzos
Attorney, Agent, or Firm—Darby & Darby

[57] ABSTRACT

A hydraulic adjustment device for variable-pitch propellers of turbo-engines comprise a shaft for driving the variable-pitch propeller. A plurality of transmission elements for feeding and draining, as well as for guiding a hydraulic fluid is disposed in the shaft. A rotation passage for the hydraulic fluid is disposed in a chamber, which surrounds the shaft. The chamber is disposed adjacent to the variable-pitch propeller and is in fluid communication with a transport medium. The hydraulic fluid is harmonious to the transport medium.

5 Claims, 2 Drawing Sheets ns,121

HYDRAULIC ADJUSTMENT DEVICE

FIELD OF THE INVENTION

The present invention relates generally to hydraulic adjustment devices. More specifically, the present invention relates to hydraulic adjustment devices for variable-pitch propellers of turbo-engines, such that transmission elements for feeding and draining and also for guiding hydraulic fluid are disposed within a shaft that drives the variable-pitch propeller.

BACKGROUND OF THE INVENTION

The German reference DE-PS 694 029 discloses a hydraulic adjustment device using a ship's screw propeller drive to adjust the propeller blades. The hydraulic fluid used here, usually oil, is conducted to the shaft in the interior of the ship. However, the seal in the area of the rotation passage always is a point of special risk. Possible leaks in this area can entail considerable consequences, especially when used for turbines or pumps. A lack of tightness in the passage would cause an impermissible mixing of hydraulic fluid with the transport medium. To prevent this, infeed devices are usually disposed in chambers which require special sealing.

Another solution is disclosed in EP-PS 0 174 286 which provides for the components of a hub lining which cross the flow chamber of the transport medium to conduct the hydraulic fluid to the variable-pitch propeller. The transfer from the stationary to the rotating part then takes place within the hub lining. However, this solution is very prone to trouble in cases where the transport media are contaminated by fibrous or granular components. These components can impede the flow to or from the rotor disk, substantially increasing the likelihood that the unit will break down.

SUMMARY OF THE INVENTION

It is an object of the present invention to develop, for hydraulically activated variable-pitch propellers, a transmission between the stationary and rotating part, which has an inexpensive structure, but which functions reliably and without troublesome influences on the transport medium even in case of untightnesses. A problem-free hydraulic adjustment device can be realized, quite simply, by disposing a rotation passage in a chamber adjoining the variable-pitch propeller and connected to the transport medium, and by using a hydraulic fluid, which in no way represents a hazard to the transport medium. If an untightness (i.e., a fluid leak) in the area of the rotation passage should occur, the system nevertheless can continue to operate without any problem. If hydraulic fluid should possibly leak, this will not negatively affect the medium being transported. For emergencies, it is also possible to bridge over the pressure drop caused by the leak, by increasing the pressure in the infeed line to the hydraulic system, thus guaranteeing a perfect operation of the turbo-engine until such a time as a repair can be made. Because the rotation passage is disposed within a chamber that adjoins the variable-pitch propeller, and is connected to the transport mediums, no complicated interventions into the interior of the turbo-engine are necessary. Usually this chamber is a part of the turbo-engine housing, which is situated next to the variable-pitch propeller and in which the shaft, together with its bearing, is disposed. Without any great structural change of the variable-pitch propeller and of the housing, the rotation passage for the hydraulic fluid can thus be positioned in the transition region between the housing and the variable-pitch propeller.

Accessibility to the transition region is also guaranteed by merely moving the variable-pitch propeller.

A modification of the present invention for a simple operating mode, provides that the hydraulic fluid is conducted from an external source, through separate lines, to the turbo-engine. Since such adjustment devices frequently are operated only occasionally, pressure can be applied by a source situated outside of the turbo-engine. The necessary connection lines between the rotation passage and the source can be supplied quite simply by means of conventional line systems.

Other modifications of the present invention, provide that the composition of the hydraulic fluid corresponds to that of the liquid component of the transport medium or that water is used as the hydraulic fluid. For example, if waste water and the like is used as the transport medium, standard drinking water, tap water, or the like is used as the hydraulic fluid. Of course, the components of the hydraulic system are designed in such a way that the system cannot be impaired by a corrosive effect from the hydraulic fluid. This inventive solution is preferably used in those applications which predominantly use water as the transport medium.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PRESENT PREFERRED EMBODIMENTS

Figure 1:
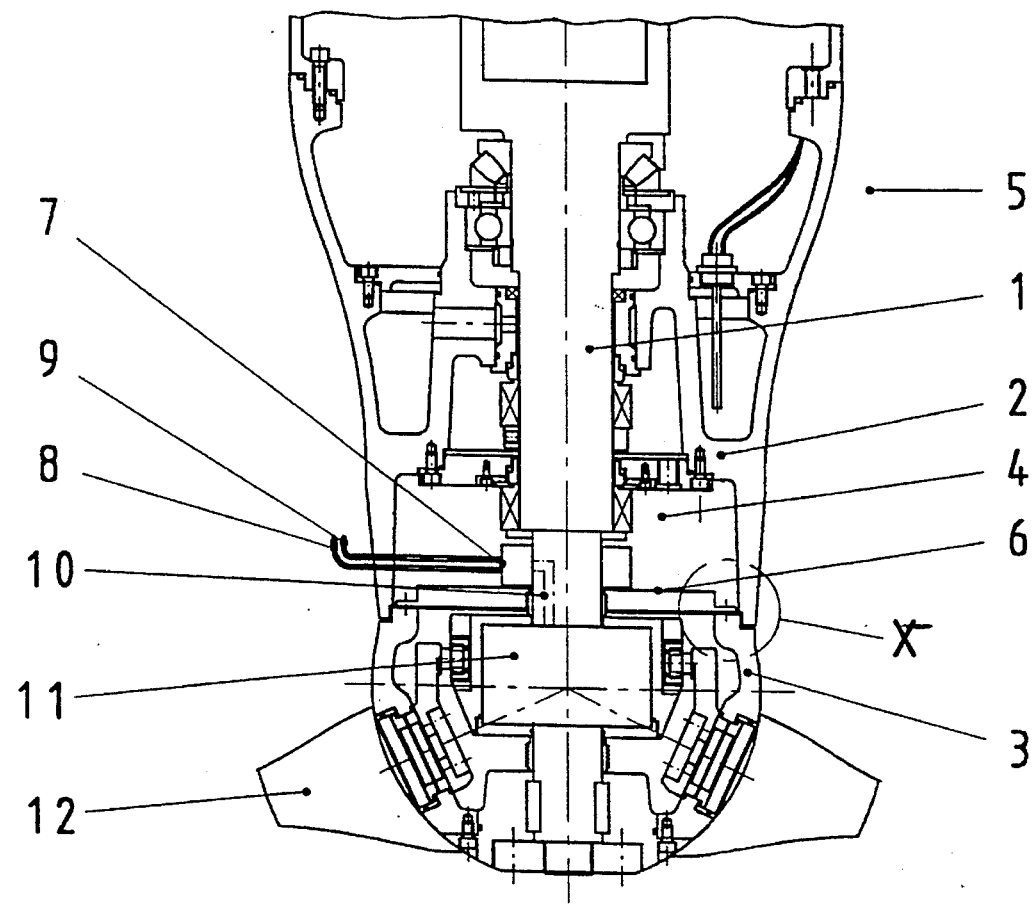
FIG. 1 is a sectional view of the hydraulic adjustment device according to the present invention.
Figure 2:
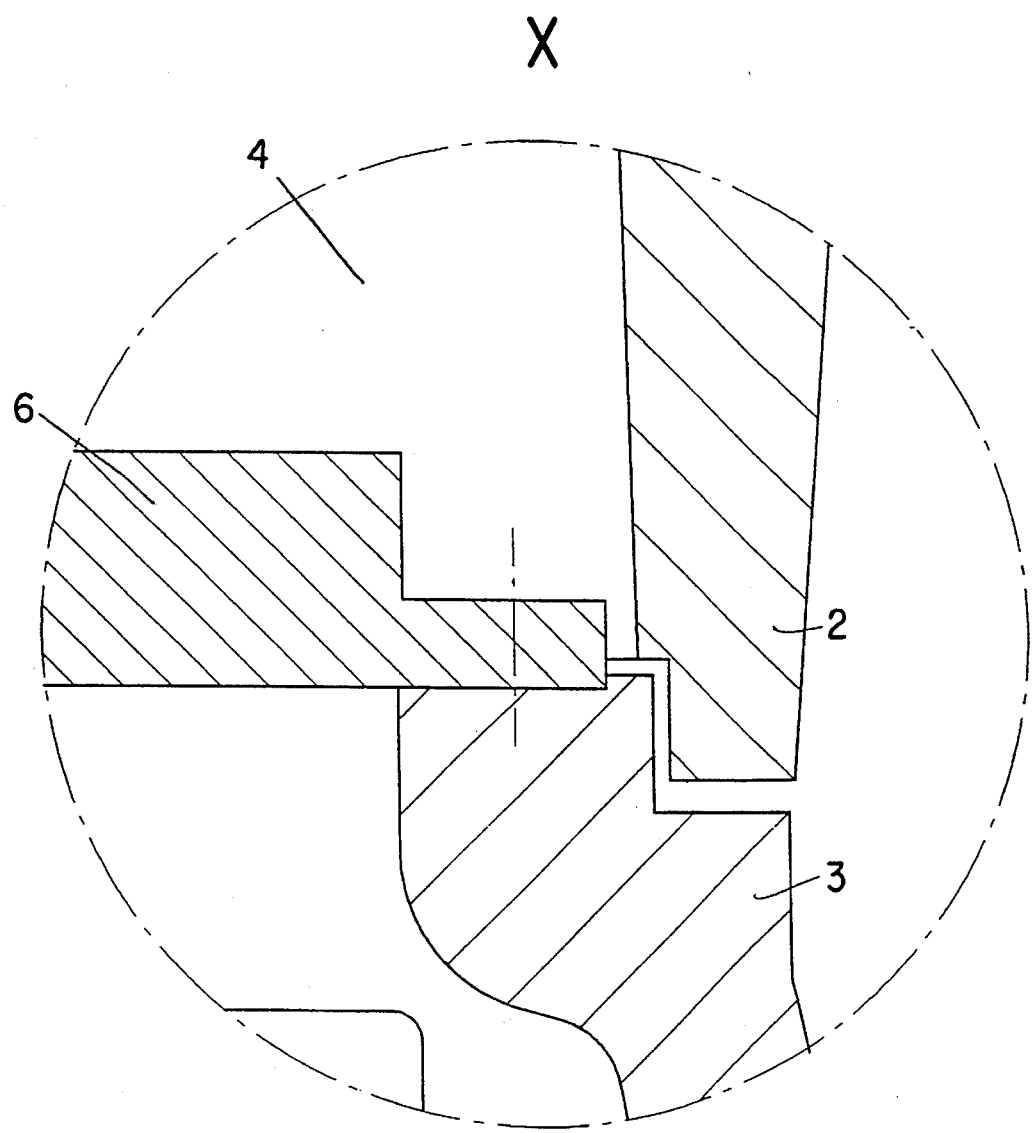
FIG. 2 shows, on an enlarged scale, the portion designated by circle X in FIG. 1.

The variable-pitch propeller 3 is disposed on a shaft 1, which is disposed within a housing 2. A chamber 4, which is connected to the flow chamber 25 and filled with fluid, is disposed between the housing 2 and the variable-pitch propeller 3. Flow chamber 5 is more accurately described as the area surrounding the turbo machine, which receives the flow of the transport medium. The housing 2 covers the chamber 4 so that the flow of transport medium will be guided in an appropriate manner. In the illustrated case, the face 6 of the variable-pitch propeller 3 projects into chamber 4. This measure also prevents fibrous or suspended materials which may be contained in the transport medium from having unhindered access to the chamber 4. The transition region between the variable-pitch propeller 5 and the housing 2 thus has a certain filter function due to centrifugal forces created by rotation of propeller 2 and face 6. Since it allows only the transport medium that is essentially free of suspended matter to flow into the chamber 4. A rotation passage 7 is disposed on that part of the shaft 1 which penetrates the chamber 4. Hydraulic fluid is fed into this passage from an external source, which is not shown here, through lines 8, 9. When media of even the most various composition are transported, this can be a hydraulic fluid which is not hazardous (i.e., is harmonious) to the transport medium. Thus, the composition of the hydraulic fluid corresponds to the liquid component of the transport medium. For reasons of simplicity, this can also be water, if the transport medium itself consists predominantly of water. The shaft I has transmission elements 10, by means of which the hydraulic fluid is conducted from the rotation passage 7 into the interior of the variable-pitch propeller 3. There, conventional adjustment systems 11 can then convert the pressure differences of the hydraulic system (i.e., from lines 8, 9 via rotation passage 7) into a blade adjustment.

From the foregoing description, it will be appreciated that the present invention makes available, a compact, cost efficient hydraulic adjustment device. The hydraulic adjustment device is designed to allow for simple operation while preventing an inadvertent fluid leak.

Having described the presently preferred exemplary embodiment of a new and improved hydraulic adjustment device in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

What we claim is:

1. A hydraulic adjustment device for adjusting a pitch of at least one blade of a variable-pitch propellers of a turbo-engine comprising:

a shaft for driving said variable-pitch propeller;

a plurality of transmission elements for feeding and draining, as well as for guiding a hydraulic fluid being disposed in said shaft;

a rotation passage for said hydraulic fluid being disposed in a chamber, which surrounds said shaft, said chamber is disposed adjacent to the variable-pitch propeller and is in fluid communication with a transport medium, said hydraulic fluid being harmonious to said transport medium.

2. The adjustment device of claim 1, wherein said hydraulic fluid is conducted from an external source, through separate lines, to the turbo-engine.

3. The adjustment device of claim 2, wherein the composition of the hydraulic fluid corresponds to that of the liquid component of the transport medium.

4. The adjustment device of claim 2, wherein the hydraulic fluid is water.

5. A hydraulic adjustment device of claim 2, wherein said separate fines are disposed in said chamber.

* * * * *